United States Patent Office 3,829,476
Patented Aug. 13, 1974

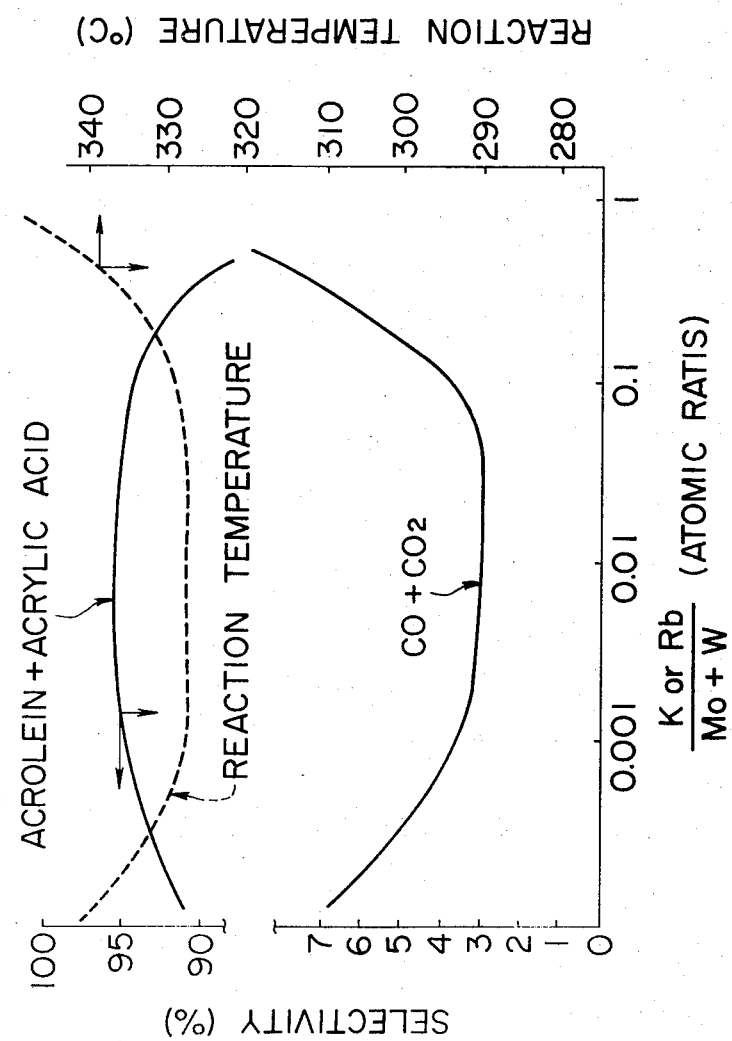

3,829,476
PROCESS FOR OXIDATION OF PROPYLENE
Kantaro Yamada and Hiromichi Ishii, Ohotake, Japan, assignors to Mitsubishi Rayon Company, Ltd., Tokyo, Japan
Filed Feb. 13, 1973, Ser. No. 332,127
Claims priority, application Japan, Feb. 15, 1972, 47/15,894
Int. Cl. C07c 47/22, 51/32, 57/04
U.S. Cl. 260—533 N                11 Claims

ABSTRACT OF THE DISCLOSURE

A process for producing acrolein and acrylic acid by bringing a mixed gas containing propylene and oxygen into contact at an elevated temperature in a vapor phase with a catalyst which is highly active and entails very little degrading effect of aging on its catalytic activity. According to this process, the total selectivity of acrolein and acrylic acid exceed 96% where the conversion of propylene is not less than 96%. The said catalyst contains phosphorus, tungsten, molybdenum, tellurium and oxygen, one combination selected from among (a) two-member combination of nickel and cobalt, (b) two-member combination of nickel and iron, (c) three-member combination of nickel, cobalt and bismuth and (d) three-member combination of nickel, iron and bismuth, and at least one member selected from the group consisting of tin, potassium and rubidium.

---

This invention relates to a novel catalyst and to a process for producing acrolein and acrylic acid by vapor-phase oxidation of propylene at an elevated temperature.

The catalysts heretofore known as useful for oxidation of propylene and other olefins include those of bismuth-phosphorus-molybdenum combination and those of bismuth - phosphorus - molybdenum - iron combination as disclosed in B.P. 821,999. Numerous suggestions have since been made for the improvement of these catalysts and the improved catalysts have succeeded in improving the conversion of olefins and the selectivity of aldehydes such as acrolein and/or acrylic acid. B.P. Specification No. 1,128,031, for example, suggests addition of nickel and/or cobalt to the aforementioned bismuth-phosphorus-molybdenum-iron catalyst. B.P. Specification No. 1,174,777 teaches addition of nickel, cobalt and/or arsenic to the aforementioned bismuth-phosphorus-molybdenum-iron catalyst. As a further improvement over such catalysts, B.P. Specification No. 1,249,290 discloses a catalyst which contains Ni, Co, Fe, As (or B), K (or Rb, Cs) and O. Particularly with the catalyst taught by B.P. Specification No. 1,249,290, the conversion of propylene (96%) and the selectivity of acrolein (93%) are both extremely high and the total selectivity of acrolein and acrylic acid, at times, reaches a high level of 97% or over. However, these catalysts yield to degradation of catalytic activities due to aging and to other problems of defective properties which remain yet to be solved.

The inventors discovered that unlike any of the aforementioned catalysts, a catalyst comprising phosphorus, tungsten, molybdenum, tellurium and oxygen has its catalytic performance improved by the coexistence therein of one member selected from the group consisting of nickel, cobalt, iron, bismuth and zinc or a two-member combination of zinc and cobalt, Japanese Patent Publication No. 10,606/68. The inventors also discovered that a catalyst comprising phosphorus, tungsten, molybdenum, tellurium and oxygen has its activity improved remarkably by the co-existence therein of a specific two-member or three-member combination of the elements of nickel, cobalt, iron and bismuth. (Japanese Patent Publication No. 40,774/72).

These catalysts produce highly satisfactory results in the reactions involved. However, they entail considerable degrading effffects of aging upon their catalytic activities and, therefore, can hardly be called commercially satisfactory catalysts.

It is, therefore, an object of this invention to provide a catalyst which is improved in terms of total selectivity of acrolein and acrylic acid based on a high conversion of propylene.

It is another object of this invention to provide an excellent commercial catalyst which is improved with respect to the problem of degrading effects of aging upon catalytic activity.

It is still another object of this invention to provide a commercially advantageous process for producing acrolein and acrylic acid in high yields by subjecting propylene to oxidation in a vapor phase in the presence of such catalyst as mentioned above. From the known catalyst mentioned above, namely, the catalyst which consists of phosphorus, tungsten, molybdenum, tellurium and oxygen and additionally contains one combination selected from among (a) two-member combination of nickel and cobalt, (b) two-member combination of nickel and iron, (c) three-member combination of nickel, cobalt and bismuth and (d) three-member combination of nickel, iron and bismuth, the catalyst of this invention differs in that the latter catalyst contains at least one member selected from tin, potassium and rubidium in addition to those components of the former catalyst.

The present invention proposes a process for the production of acrolein and acrylic acid, characterized by bringing a mixed gas containing propylene and oxygen into contact at an elevated temperature in a vapor phase with a catalyst which consists of phosphorus, tungsten, molybdenum, tellurium, oxygen, one combination selected from among (a) two-member combination of nickel and cobalt, (b) two-member combination of nickel and iron, (c) three-member combination of nickel, cobalt and bismuth and (d) three-member combination of nickel, iron and bismuth and at least one member selected from the group consisting of tin, potassium and rubidium.

CATALYST

The catalyst of the present invention is the product of the combination of the three groups of elements listed below.

Group I: P-W-Mo-Te-O
Group II:
    (a) Ni-Co
    (b) Ni-Fe
    (c) Ni-Co-Bi
    (d) Ni-Fe-Bi
Group III: Sn, K, Rb The elements of Group I are all essential components. It is an essential requirement that the catalyst consists of all the elements of Group I, a two- or three-member combination selected from among the four combinations of Group II, and at least one member selected from the Group III consisting of the three indicated elements.

The state in which the catalyst of this invention exists is not critical in any way. For example, it may exist in the form of a mixture of the oxides of phosphorus and the respective metallic elements or in the form of the oxidation product of that which has these elements combined in some manner or other.

The catalyst to be used for the present invention enjoys fairly high catalytic performance even if the atomic ratios of phosphorus and the respective metallic elements are varied in a relatively wide range. This is because the addition of tin, potassium and/or rubidium has an extremely large effect. Even in the case of a catalyst excluding these components and having a composition falling in a range in which the catalyst does not suit practical use, addition of potassium or rubidium brings forth remarkable improvement in the catalytic performance to the extent of rendering the catalyst suitable for practical use. The atomic ratios of the components which are particularly suitable for practical use are as follows:

Group I

The atomic ratio of tungsten to molybdenum is desired to fall in the range of from 0.01 to 100, preferably 0.02 to 50, that of tellurium to the sum of tungsten and molybdenum in the range of from 0.01 to 0.2, preferably 0.02 to 0.15 and that of phosphorus to the sum of tungsten and molybdenum in the range of from 0.01 to 1, preferably 0.02 to 0.3 respectively.

Group II

As to the proportion in which the two members of nickel and cobalt, the two members of nickel and iron, the three members of nickel, cobalt and bismuth or the three members of nickel, iron and bismuth, the atomic ratio of the two or three members in coexistence to the sum of tungsten and molybdenum is desired to fall in the range of from 0.08 to 2 with respect to the total of the metallic members involved and in the range of from 0.02 to 1 with respect to each of the metallic members involved. Of all the combinations, the combination of nickel, iron and bismuth gives the best results.

Group III

The atomic ratio of tin to the sum of tungsten and molybdenum is desired to fall in the range of from 0.01 to 1, preferably 0.02 to 0.5. The atomic ratio of potassium and/or rubidium to the sum of tungsten and molybdenum is desired to fall in the range of from 0.0005 to 0.3, preferably 0.002 to 0.1.

The catalyst useful in the present invention may be deposited upon any of the well-known carriers such as silica gel, silica-alumina, corundum and silicon carbide.

The catalyst of the present invention is characterized, as mentioned above, by adding Group III to the known catalyst composition.

A surprising fact has been discovered that the presence of tin in the catalyst of this invention lowers the reaction temperature by more than 30 centigrade degrees and thoroughly eliminates possible degrading effect of aging on catalytic performance.

There has been made a surprising discovery that the addition of potassium and/or rubidium results in decrease of the by-production of carbon monoxide and carbon dioxide. The reaction brought about by the said known catalyst produces quite satisfactory results; the total selectivity of acrolein and acrylic acid reaches 91–94% where the conversion of propylene is in the range exceeding 95%. However, the total selectivity of carbon monoxide and carbon dioxide occurring as by-products reaches about 5–8%. From the commercial point of view, it is desirable for the improvement of productivity and the removal of the heat of reaction that the by-production of carbon monoxide and carbon dioxide should be decreased as far as possible.

It has been found that in the catalyst of the present invention, the presence of potassium and/or rubidium in conjunction with tin markedly enhances the durability of catalytic activity, reduces the selectivity of carbon monoxide and carbon dioxide and increases the total selectivity of acrolein and acrylic acid.

If, in the catalyst of this invention, an alkali metal of the same group such as lithium, sodium or cesium is added in place of potassium or rubidium, the catalytic activity is conversely decreased and the by-production rate of carbon monoxide and carbon dioxide is increased. In consideration of this fact, the aforementioned advantages may be explained by assuming that potassium or rubidium reacts in a specific manner with the oxide of molybdenum or some other metallic elements to form new active sites.

The amount of potassium and/or rubidium to be added, the catalytic activity, the yield of acrolein and acrylic acid and the by-production ratio of carbon monoxide and carbon dioxide are correlated as illustrated in the annexed Figure. In the amount of potassium and/or rubidium, there exists the optimum range.

The preparation of the catalyst is easy for persons skilled in the art and does not require any special procedures. A typical procedure comprises the steps of evaporating to dryness either the aqueous solution or suspension of raw materials of the catalyst and subsequently calcining the evaporation product in the air. The raw materials for the catalyst are desired to be in the form of metals, oxides, chlorides, acids, ammonium salts, or nitrates of metals, i.e. the kind of compounds which convert themselves into oxides by calcination. It is also possible to use such complex compounds as ammonium phosphotungstate, telluromolybdic acid and stannomolybdic acid.

The propylene used in the present invention is not always required to be pure. It may contain such saturated hydrocarbons as propane. Such saturated hydrocarbons act as a diluent for propylene. From an economical point of view, it is advantageous to use air as the oxygen source.

The ratio of propylene to oxygen in the mixed gas used as the feed gas is in the range of 1:0.5–1:3, preferably 1:1–1:2 by volume. Propylene and oxygen in the mixed gas are desired to be diluted with such inert gases as nitrogen, steam and carbon dioxide. The reaction may be carried out under normal atmospheric pressure or under elevated pressure. Desirably the reaction temperature falls in the range of from 200 to 500° C., preferably 250 to 400° C. The contact time is desired to fall in the range of from 0.5 to 10 seconds.

The present invention will now be specifically described with reference to working examples and comparative examples, wherein parts are by weight.

EXAMPLE 1

In 600 parts of water, 38.5 parts of ammonium paratungstate was dissolved by boiling. To this solution were added first a solution having 5.0 parts of ammonium paramolybdate dissolved in 50 parts of water and a mixed solution having 2.7 parts of cobalt nitrate and 2.8 parts of nickel nitrate dissolved in 100 parts of water, then 5.0 parts of 85% phosphoric acid and 4.1 parts of tellurium dioxide, and finally a solution having 2.1 parts of stannous chloride dissolved in 20 parts of 10% nitric acid. Over a water bath, the resultant mixture was evaporated to dryness while under agitation. The evaporation product was dried at 120° C., pelleted and calcined at 500° C. for six hours under the current of air. The calcined product was put to use as a catalyst.

EXAMPLE 2

In 600 parts of water, 38.5 parts of ammonium paratungstate was dissolved by boiling. To this solution were added first a solution having 35.3 parts of ammonium paramolybdate dissolved in 200 parts of water and a mixed solution having 33.7 parts of iron nitrate and 8.3 parts of nickel nitrate dissolved in 200 parts of water, then 6.6 parts of 85% phosphoric acid, and finally a solution having 30.0 parts of stannous chloride dissolved in 300 parts of 10% nitric acid. The resultant mixture was evaporated to dryness over a water bath while under agitation. The evaporation product was calcined at 500° C. for six hours under the current of air. The calcined product was mixed thoroughly with 6.8 parts of tellurium dioxide added thereto, then pelleted and put to use as a catalyst.

EXAMPLE 3

In 100 parts of water, 4.5 parts of ammonium paratungstate was dissolved. To this solution were added first a solution having 35.3 parts of ammonium paramolybdate dissolved in 200 parts of water and a mixed solution having 4.8 parts of cobalt nitrate and 19.4 parts of nickel nitrate dissolved in 100 parts of water, then a solution having 8.1 parts of bismuth nitrate dissolved in 60 parts of 10% nitric acid and 1.9 parts of 85% phosphoric acid, further 2.5 parts of stannic oxide and 0.8 part of tellurium dioxide, and finally 45 parts of 10% silica sol. The resultant mixture was evaporated to dryness while under agitation, dried at 120° C., then pelleted and calcined at 500° C. for six hours under the current of air. The calcined product was put to use as a catalyst.

EXAMPLE 4

In 600 parts of water, 27.0 parts of ammonium paratungstate was dissolved. To the solution were added first a solution having 35.3 parts of ammonium paramolybdate dissolved in 200 parts of water and a mixed solution having 13.5 parts of iron nitrate and 4.9 parts of nickel nitrate dissolved in 100 parts of water, then as solution having 32.3 parts of bismuth nitrate dissolved in 150 parts of 10% nitric acid and a solution having 1.9 parts of stannous chloride dissolved in 20 parts of 10% nitric acid, and finally 3.8 parts of 85% phosphoric acid. The resultant mixture was evaporated to dryness while under agitation and then calcined at 500° C. for six hours under the current of air. The calcined product was thoroughly mixed with 5.6 parts of tellurium dioxide added thereto, then pelleted and put to use as a catalyst.

Comparative Examples 1–4

Catalysts were prepared by repeating the procedures of Example 1 through Example 4, except for the omission of the addition of tin compound.

In the presence of respective catalysts prepared by Examples 1 through 4 and Comparative Examples 1 through 4, a mixed gas composed of 6% of propylene, 12% of oxygen, 30% of steam and 52% of nitrogen by volume was subjected to reaction at a prescribed temperature, with the contact time fixed at 3.6 seconds.

The results are shown in the following table.

As is apparent from the table, the addition of tin produced a tremendous effect. The addition of tin resulted in thorough elimination of degrading effect of aging upon catalytic activity.

nickel nitrate dissolved in 100 parts of water and a solution having 1.71 parts of potassium nitrate dissolved in 10 parts of water. Then, 5.0 parts of 85% phosphoric acid and 4.1 parts of tellurium dioxide were added. Over a water bath, the resultant mixture was evaporated to dryness while under agitation. The evaporation product was dried at 120° C., pelleted and calcined at 500° C. for six hours under the current of air. The product was used as a catalyst.

A mixed gas composed of 6% of propylene, 12% of oxygen, 30% of steam and 52% of nitrogen by volume was introduced into a catalyst bed kept at 335° C. with a contact time of 3.6 seconds.

The products were analyzed by methods of gas chromatography and chemical analysis. Consequently, the conversion of propylene was found to be 96.5%, the selectivity of acrolein to be 87.0%, the selectivity of acrylic acid to be 7.2% and the total selectivity of carbon monoxide and carbon dioxide to be only 4.1%.

EXAMPLE 6

In 600 parts of water, 38.5 parts of ammonium paratungstate was dissolved by boiling. To the solution were added a solution having 35.3 parts of ammonium paramolybdate in 200 parts of water, a mixed solution having 33.7 parts of iron nitrate and 8.3 parts of nickel nitrate dissolved in 200 parts of water and a solution having 4.14 parts of rubidium chloride in 50 parts of water. Then, 6.6 parts of 85% phosphoric acid were added. Over a water bath, the mixture was evaporated to dryness while under agitation. The evaporation product was calcined at 500° C. for six hours under the current of air. The calcined product was thoroughly mixed with 6.8 parts of tellurium dioxide added thereto, and subsequently pelleted. The pelleted product was used as a catalyst.

The reaction of Example 5 was repeated under the same conditions, except that the catalyst bed was kept at 305° C. Consequently, the conversion of propylene was found to be 97.0%, the selectivity of acrolein to be 86.0%, the selectivity of acrylic acid to be 8.6% and the total selectivity of carbon monoxide and carbon dioxide to be only 4.3%.

EXAMPLE 7

In 100 parts of water, 4.5 parts of ammonium paratungstate were dissolved. To this solution were added a solution having 35.3 parts of ammonium paramolybdate dissolved in 200 parts of water, a mixed solution having 4.8

| | Example 1 | | | Comparative Example 1 | | | Example 2 | | | Comparative Example 2 | | |
|---|---|---|---|---|---|---|---|---|---|---|---|---|
| Composition of catalyst | PMo-WTe-Sn Co-Ni | | | PMo-WTe Co-Ni | | | PMo-WTe-Sn Fe-Ni | | | PMo-WTe Fe-Ni | | |
| Reaction temperature (° C.) | 310 | | | 340 | | | 290 | | | 315 | | |
| Reaction time (hr.) | 1 | 29 | 60 | 1 | 31 | 62 | 1 | 31 | 62 | 1 | 30 | 50 |
| Conversion of propylene (percent) | 96.1 | 96.2 | 96.0 | 95.8 | 74.5 | 65.2 | 96.7 | 96.8 | 96.8 | 97.1 | 78.4 | 63.5 |
| Selectivity of acrolein (percent) | 85.1 | 85.3 | 85.3 | 84.6 | 86.2 | 87.0 | 85.5 | 85.7 | 85.9 | 85.3 | 86.4 | 87.7 |
| Selectivity of acrylic acid (percent) | 6.1 | 5.8 | 6.0 | 6.2 | 6.0 | 5.3 | 5.5 | 5.2 | 5.0 | 5.4 | 5.1 | 4.9 |

| | Example 3 | | | Comparative Example 3 | | | Example 4 | | | Comparative Example 4 | | |
|---|---|---|---|---|---|---|---|---|---|---|---|---|
| Composition of catalyst | PMo-WTe-Sn Bi-Co-Ni | | | PMo-WTe Bi-Co-Ni | | | PMo-WT Bi-Fe-Ni | | | PMo-WTe Bi-Fe-Ni | | |
| Reaction Temperature (° C.) | 300 | | | 340 | | | 300 | | | 335 | | |
| Reaction time (hr.) | 1 | 30 | 65 | 1 | 30 | 50 | 1 | 28 | 60 | 1 | 33 | 60 |
| Conversion of propylene (percent) | 96.3 | 96.0 | 96.0 | 96.2 | 71.3 | 60.8 | 95.8 | 96.1 | 96.0 | 95.7 | 78.1 | 65.4 |
| Selectivity of acrolein (percent) | 88.7 | 88.4 | 89.0 | 89.0 | 90.1 | 91.5 | 88.0 | 88.2 | 88.4 | 88.1 | 88.9 | 90.2 |
| Selectivity of acrylic acid (percent) | 5.5 | 5.7 | 5.2 | 4.8 | 4.2 | 4.0 | 5.8 | 5.9 | 5.4 | 5.8 | 5.2 | 4.7 |

EXAMPLE 5

In 600 parts of water, 38.5 parts of ammonium paratungstate was dissolved by boiling. To the solution were added a solution having 5.0 parts of ammonium paramolybdate dissolved in 50 parts of water, a mixed solution having 2.7 parts of cobalt nitrate and 2.8 parts of parts of cobalt nitrate and 19.4 parts of nickel nitrate dissolved in 100 parts of water and a solution having 0.05 parts of rubidium chloride in 20 parts of water. Then, a solution having 8.1 parts of bismuth nitrate dissolved in 60 parts of 10% nitric acid and 1.9 parts of 85% phosphoric acid were added. Further, 0.8 parts of tellurium dioxide was added and 45 parts of 10% silica sol was finally added. The resultant mixture was evaporated to dryness while under agitation, dried at 120° C., then pelleted and calcined at 500° C. for six hours under the current of air. The product thus obtained was used as a catalyst.

The reaction of Example 5 was repeated under the same conditions, except that the catalyst bed was kept at 330° C. Consequently, the conversion of propylene was found to be 97.0%, the selectivity of acrolein to be 89.0%, the selectivity of acrylic acid to be 7.1% and the total selectivity of carbon monoxide and carbon dioxide to be only 3.0%.

EXAMPLE 8

In 600 parts of water were dissolved 27.0 parts of ammonium paratungstate. To the solution were added a solution having 35.3 parts of ammonium paramolybdate dissolved in 200 parts of water and a mixed solution having 13.5 parts of iron nitrate and 4.9 parts of nickel nitrate dissolved in 100 parts of water. A solution having 32.3 parts of bismuth nitrate dissolved in 150 parts of 10% nitric acid, a solution having 1.54 parts of potassium nitrate dissolved in 20 parts of water and 3.8 parts of 85% phosphoric acid were added. The mixture was evaporated to dryness while under agitation and then calcined at 500° C. for six hours under the current of air. The calcined product was thoroughly mixed with 5.6 parts of tellurium dioxide added thereto and thereafter pelleted. The pelleted product was used as a catalyst. The reaction of Example 5 was repeated under the same conditions, except that the catalyst bed was kept at 320° C. Consequently, the conversion of propylene was found to be 96.5%, the selectivity of acrolein to be 88.1%, the selectivity of acrylic acid to be 8.0% and the total selectivity of carbon monoxide and carbon dioxide to be only 3.3%.

EXAMPLE 9

In 600 parts of water, 38.5 parts of ammonium paratungstate was dissolved by boiling. To this solution were added first a solution having 35.3 parts of ammonium paramolybdate dissolved in 200 parts of water, a mixed solution having 2.7 parts of cobalt nitrate and 2.8 parts of nickel nitrate dissolved in 100 parts of water and a solution having 0.86 parts of potassium nitrate dissolved in 20 parts of water, then 5.0 parts of 85% phosphoric acid and 4.1 parts of tellurium dioxide, and finally a solution having 2.1 parts of stannous chloride dissolved in 20 parts of 10% nitric acid. Over a water bath, the resultant mixture was evaporated to dryness while under agitation. The evaporation product was dried at 120° C., pelleted and then calcined at 500° C. for six hours under the current of air. The calcined product was used as a catalyst.

The reaction of Example 5 was repeated under the same conditions, except that the catalyst bed was kept at 305° C. Consequently, the conversion of propylene was found to be 96.0%, the selectivity of acrolein to be 86.7%, the selectivity of acrylic acid to be 6.8% and the total selectivity of carbon monoxide and carbon dioxide to be only 3.6%.

EXAMPLE 10

In 600 parts of water, 38.5 parts of ammonium paratungstate was dissolved by boiling. To this solution were added first a solution having 35.3 parts of ammonium paramolybdate dissolved in 200 parts of water, a mixed solution having 33.7 parts of iron nitrate and 8.3 parts of nickel nitrate dissolved in 200 parts of water and a solution having 0.07 part of potassium nitrate dissolved in 20 parts of water, then 6.6 parts of 85% phosphoric acid, and finally a solution having 30.0 parts of stannous chloride dissolved in 300 parts of 10% nitric acid. Over a water bath, the resultant mixture was evaporated to dryness while under agitation. Then, the evaporation product was calcined at 500° C. for six hours under the current of air. The calcined product was thoroughly mixed with 6.8 parts of tellurium dioxide added thereto, and then pelleted. The pelleted product was used as a catalyst. The reaction of Example 5 was repeated under the same conditions, except that the catalyst bed was kept at 280° C. Consequently, the conversion of propylene was found to be 97.3%, the selectivity of acrolein to be 86.5%, the selectivity of acrylic acid to be 7.7% and the total selectivity of carbon monoxide and carbon dioxide to be only 3.8%.

EXAMPLE 11

In 100 parts of water 4.5 parts of ammonium paratungstate was dissolved. To this solution were added first a solution having 35.3 parts of ammonium paramolybdate dissolved in 200 parts of water, a mixed solution having 4.8 parts of cobalt nitrate and 19.4 parts of nickel nitrate dissolved in 100 parts of water and a solution having 1.26 parts of rubidium chloride dissolved in 20 parts of water, then a solution having 8.1 parts of bismuth nitrate dissolved in 60 parts of 10% nitric acid and 1.9 parts of 85% phosphoric acid, further 2.5 parts of stannic oxide and 0.8 parts of tellurium dioxide and finally 45 parts of 10% silica sol. The resultant mixture was evaporated to dryness while under agitation, dried at 120° C., pelleted, and calcined at 500° C. for six hours under the current of air. The product thus obtained was used as a catalyst. The reaction of Example 5 was repeated under the same conditions, except that the catalyst bed was kept at 295° C. Consequently, the conversion of propylene was found to be 96.5%, the selectivity of acrolein to be 89.4%, the selectivity of acrylic acid to be 7.0% and the total selectivity of carbon monoxide and carbon dioxide to be only 2.4%.

EXAMPLE 12

In 600 parts of water was dissolved 27.0 parts of ammonium paratungstate. To this solution were added first a solution having 35.3 parts of ammonium paramolybdate dissolved in 200 parts of water, a mixed solution having 13.5 parts of iron nitrate and 4.9 parts of nickel nitrate dissolved in 100 parts of water and a solution having 3.08 parts of potassium nitrate dissolved in 20 parts of water, then a solution having 32.3 parts of bismuth nitrate dissolved in 150 parts of 10% nitric acid and 1.9 parts of stannous chloride dissolved in 20 parts of 10% nitric acid, and finally 3.8 parts of 85% phosphoric acid. This mixture was evaporated to dryness while under agitation and then calcined at 500° C. for six hours under the current of air. The calcined product was thoroughly mixed with 5.6 parts of tellurium dioxide added thereto, then pelleted and put to use as a catalyst. The reaction of Example 5 was repeated under the same conditions, except that the catalyst bed was kept at 290° C. Consequently, the conversion of propylene was found to be 96.1%, the selectivity of acrolein to be 88.1%, the selectivity of acrylic acid to be 8.0% and the total selectivity of carbon monoxide and carbon dioxide to be only 2.2%.

EXAMPLE 13

In 50 parts of water was dissolved 2.25 parts of ammonium paratungstate. To this solution were added first a solution having 35.3 parts of ammonium paramolybdate dissolved in 200 parts of water, a mixed solution having 20.2 parts of iron nitrate and 43.7 parts of nickel nitrate dissolved in 500 parts of water and a solution having 0.210 part of potassium nitrate dissolved in 20 parts of water, then a solution having 16.2 parts of bismuth nitrate dissolved in 50 parts of 10% nitric acid and a solution having 3.8 parts of stannous chloride dissolved in 50 parts of 10% nitric acid, and finally 1.9 parts of 85% phosphoric acid. This mixture was evaporated to dryness while under agitation and then calcined at 500° C. for six hours under the current of air. The calcined product was thoroughly mixed with 5.35 parts of tellurium dioxide added thereto, pelleted and put to use as a catalyst.

The reaction of Example 5 was repeated under the same conditions, except that the catalyst bed was kept at 295°

C. Consequently, the conversion of propylene was found to be 94.2%, the selectivity of acrolein to be 87.3%, the selectivity of acrylic acid to be 6.8% and the total selectivity of carbon monoxide and carbon dioxide to be 4.0%.

EXAMPLE 14

A catalyst identical with that of Example 10 except for the omission of the addition of potassium nitrates was used. The reaction of Example 5 was repeated under the same conditions, except that the catalyst bed was kept at 290° C. Consequently, the conversion of propylene was found to be 96.7%, the selectivity of acrolein to be 85.5%, the selectivity of acrylic acid to be 5.5% and the total selectivity of carbon monoxide and carbon dioxide to be 7.2%.

Comparative Example 5

A catalyst identical with that of Example 5 except for the omission of the addition of potassium nitrate was used. The reaction of Example 5 was repeated under the same conditions, except that the catalyst bed was kept at 340° C. Consequently, the conversion of propylene was found to be 95.8%, the selectivity of acrolein to be 84.6%, the selectivity of acrylic acid to be 6.2% and the total selectivity of carbon monoxide and carbon dioxide to be 7.1%.

Comparative Example 6

A catalyst identical with that of Example 8 except for the omission of the addition of potassium nitrate was used. The reaction of Example 5 was repeated under the same conditions, except that the catalyst bed was kept at 335° C. Consequently, the conversion of propylene was found to be 95.7%, the selectivity of acrolein to be 88.1%, the selectivity of acrylic acid to be 5.8% and the total selectivity of carbon monoxide and carbon dioxide to be 5.3%.

Comparative Example 7

A catalyst which was identical with that of Example 5 except for the addition of a solution having 0.04 parts of lithium hydroxide dissolved in place of potassium nitrate in 20 parts of water was used. The reaction of Example 5 was repeated under the same conditions, except that the catalyst bed was kept at 355° C. Consequently, the conversion of propylene was found to be 95.0%, the selectivity of acrolein to be 78.8%, the selectivity of acrylic acid to be 6.5% and the total selectivity of carbon monoxide and carbon dioxide to be 9.8%.

Comparative Example 8

A catalyst which was identical with that of Example 8 except for the addition of a solution having 1.29 parts of sodium nitrate dissolved in place of potassium nitrate in 20 parts of water was used. The reaction of Example 5 was repeated under the same conditions, except that the catalyst bed was kept at 345° C. Consequently, the conversion of propylene was found to be 93.5%, the selectivity of acrolein to be 77.4%, the selectivity of acrylic acid to be 7.5% and the combined selectivity of carbon monoxide and carbon dioxide to be 9.7%.

Comparative Example 9

A catalyst which was identical with that of Example 10 except for the addition of a solution having 0.13 parts of cesium nitrate dissolved in place of potassium nitrate in 20 parts of water was used. The reaction of Example 5 was repeated under the same conditions, except that the catalyst bed was kept at 325° C. Consequently, the conversion of propylene was found to be 95%, the selectivity of acrolein to be 76.5%, the selectivity of acrylic acid to be 7.4% and the total selectivity of carbon monoxide and carbon dioxide to be 9.1%.

What is claimed is:
1. A process for the production of acrolein and acrylic acid, characterized by bringing a mixed gas containing propylene and oxygen into contact at an elevated temperature in a vapor phase with a catalyst which is obtained by adding at least one member selected from among the elements of the group III shown below to a composition consisting of all the elements of the group I and one combination of metals selected from among the combinations of the group II:

I. $P+W+Mo+Te+O$
   wherein, the ratio W/Mo falls in the range of 0.01–0.2, the ratio $P/(W+Mo)$ in the range of 0.01–1

II. (a) $Ni+Co$
    (b) $Ni+Fe$
    (c) $Ni+Co+Bi$
    (d) $Ni+Fe+Bi$
    wherein, the ratio of the total of metals in the selected combination to $W+Mo$ falls in the range of 0.08–2 and the ratio of each metal to $W+Mo$ in the range of 0.02–1

III. Sn, K and Rb
    wherein the ratio of Sn to $W+Mo$ falls in the range of 0.01 to 1 and the ratio of K, Rb or $K+Rb$ to $W+Mo$ in the range of 0.0005 to 0.3

2. A process according to Claim 1, wherein there is used a catalyst containing therein Sn.
3. A process according to Claim 1, wherein there is used a catalyst containing therein Sn and K.
4. A process according to Claim 1, wherein there is used a catalyst containing Sn and Rb.
5. A process according to Claim 1, wherein there is used a catalyst containing therein Sn, K and Rb.
6. A process according to Claim 1, wherein there is used a catalyst containing therein K.
7. A process according to Claim 1, wherein there is used a catalyst containing therein Rb.
8. A process according to Claim 1, wherein there is used a catalyst containing therein K and Rb.
9. A process according to Claim 1, wherein the combination (d) is used as the group II.
10. A process according to Claim 1, wherein the reaction is carried out at temperatures in the range of from 200 to 500° C.
11. A process according to Claim 1, wherein the reaction is carried out with the contact time fixed in the range from 0.5 to 10 seconds.

References Cited

UNITED STATES PATENTS 3,703,550  11/1972  Nakano et al. _____ 260—533 N
3,576,764  4/1971   Yamaguchi et al. ___ 260—533 N LORRAINE A. WEINBERGER, Primary Examiner
R. D. KELLY, Assistant Examiner U.S. Cl. X.R.
260—604 R; 252—437